United States Patent
Böckhoff et al.

(10) Patent No.: US 7,778,761 B2
(45) Date of Patent: Aug. 17, 2010

(54) DEVICE FOR THE CONTROL OF AN INTERNAL COMBUSTION ENGINE OPERABLE WITH LIQUID AND/OR GASEOUS FUEL

(75) Inventors: Nicolaus Böckhoff, Aichach (DE); Fabian Huslik, Augsburg (DE); Harald Müller, Biberbach (DE); Christoph Pientschik, Klosterlechfeld (DE)

(73) Assignee: MAN Diesel SE, Augsburg (DE)

( * ) Notice: Subject to any disclaimer, the term of this patent is extended or adjusted under 35 U.S.C. 154(b) by 138 days.

(21) Appl. No.: 12/284,001

(22) Filed: Sep. 17, 2008

(65) Prior Publication Data
US 2009/0076712 A1 Mar. 19, 2009

(30) Foreign Application Priority Data
Sep. 18, 2007 (DE) .................. 10 2007 044 522

(51) Int. Cl.
*F02D 45/00* (2006.01)
(52) U.S. Cl. ................... 701/103; 123/575; 123/27 GE
(58) Field of Classification Search ......... 701/103–105; 123/575, 27 GE
See application file for complete search history.

(56) References Cited

U.S. PATENT DOCUMENTS 4,576,137 A * 3/1986 Tanaka ....................... 123/575
5,606,853 A * 3/1997 Birch et al. ................ 60/39.281
5,937,800 A * 8/1999 Brown et al. ............. 123/27 GE

FOREIGN PATENT DOCUMENTS

JP        8-61096 A *   3/1996

* cited by examiner

*Primary Examiner*—Hieu T Vo
(74) *Attorney, Agent, or Firm*—Cohen Pontani Lieberman & Pavane LLP

(57) ABSTRACT

Presented is a device for controlling an internal combustion engine operable with at least on of liquid and gaseous fuel. The device includes a rotational speed controller that outputs a control signal, which is dependent on the actual rotational speed of the engine and which influences the power output of the engine. The control signal includes a dimension for the total power to be output by the engine. The device further includes a dividing device configured for receiving the dimension, dividing the dimension for the total power according to a predetermined ratio into a contribution of the liquid fuel and a contribution of the gaseous fuel, and generating and outputting a second and a third control signal. The second control signal influences the liquid fuel quantity injected into the engine per unit time and the third control signal influences the gas fuel quantity injected into the engine per unit time.

5 Claims, 1 Drawing Sheet

DEVICE FOR THE CONTROL OF AN INTERNAL COMBUSTION ENGINE OPERABLE WITH LIQUID AND/OR GASEOUS FUEL

BACKGROUND OF THE INVENTION

1. Field of the Invention

The invention relates to a device for controlling an internal combustion engine that operates with liquid and/or gaseous fuel.

2. Description of the Related Art

Typically, engines that operate with liquid and/or gaseous fuel are designed for high output, run at a predetermined constant speed, and drive a generator to generate electric current. The use of such engines is more preferably of interest where gaseous fuel as advantageous alternative to liquid fuel is easily available, such as for example in the case of stationary plants for power generation near gas extraction areas or for driving tankers transporting gas.

The necessity of being able to operate an engine with both gas and liquid fuel, such as diesel fuel, results from the fact that starting the engine is always only possible using liquid fuel, and that operation must be guaranteed even if the gas supply fails. Hence, it follows that it must be possible to change the engine over from one type of fuel to the other type of fuel during continuous operation.

A known type of fuel changeover in continuous operation provides for linearly throttling the supply of the fuel used up to then with a fixed predetermined rate starting from the current value at the start of the conversion as far as zero. The output of the rotational speed controller at the start of the conversion is separated from the fuel supply system of the fuel type up to now, reset to zero and connected to the fuel supply system of the new fuel type. Because of its normal manner of operation, the rotational speed controller subsequently increases the supply of the new type of fuel automatically to the correct extent in order to offset the increasing throttling of the supply of the previous fuel type until a stationary state in the exclusive operation with the new type of fuel is reached.

A disadvantage of this concept is that it only allows a gradual changeover and does not allow a rapid changeover from one fuel type to the other fuel type because the rotational speed controller is optimised for keeping the rotational speed constant and, therefore, can only offset slow throttling of the previous fuel type when no drop in power is allowed to occur. However, it is desirable to have the capability of a rapid changeover from operating the engine with gas to operating with liquid fuel because if the gas supply develops a leak, the gas supply must be interrupted immediately because of the explosion hazard.

SUMMARY OF THE INVENTION

The object of the invention therefore consists in making possible a rapid changeover from one fuel type to the other with a generic engine.

The invention provides continuously controlling the fuel supply systems of both fuel types parallel with each other and in the process dividing the contributions of the individual fuel types to the total power of the engine in a predetermined ratio. Here, operation with only one fuel type corresponds to a ratio value of zero or one and a changeover of the fuel type to a change of the ratio value from zero to one or vice versa. Since the control continuously acts parallel on both fuel supply systems, a changeover can take place as rapidly as possible and in terms of speed is only limited by the signal time delays in the control electronics and by the response times of the actuators in the fuel supply systems.

The continuous operation of the control of both fuel supply systems has the additional advantage that, beyond the rapid changeover between the two fuel types, it also enables a mixed operation of the engine with both fuel types simultaneously. Here, the ratio of the contributions of the two fuel types to the total power of the engine can be adjusted as desired. To this end, by means of particular characteristics for both fuel types, the particular power contribution intended is converted into a particular adjusting signal for the fuel supply system of each individual fuel type. An advantageous application of the mixed operation more preferably lies in the possibility of achieving an engine output with insufficient gas quantity through the additional supply of liquid fuel, which would not be attainable with gas-only operation.

Because the gas quality can be subjected to fluctuations, an advantageous embodiment of the invention provides measuring the actual power and utilizing the difference between the total power calculated by the rotational speed controller and the actual power for correcting the set gas pressure value, i.e. to increase the set value via a controller when the actual power lags behind the calculated power in order to counteract the underlying reduction of the gas quality. Realising this concept is simplified if the engine drives a generator for power generation since the actual engine power can be electrically measured without problems.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in more detail below by reference to the drawing.

DETAILED DESCRIPTION OF THE PRESENTLY PREFERRED EMBODIMENTS

Figure 1:
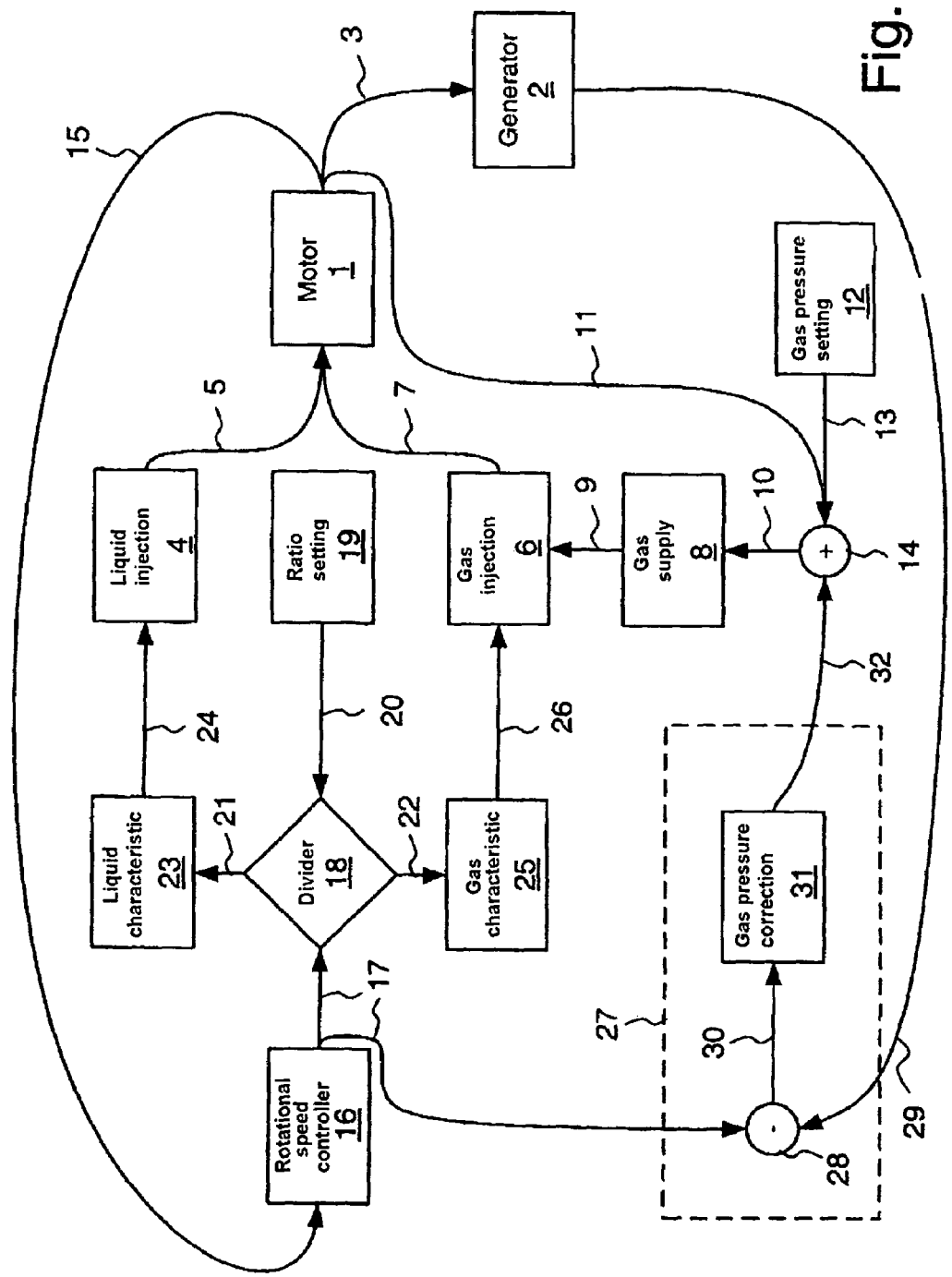
FIG. 1 is an illustrative signal flowchart of a device according to one embodiment the invention.

Referring to FIG. 1, an engine 1, driving an electric generator 2 with a power 3 can be supplied from a fuel injection system 4 with a liquid fuel throughput 5 and/or from a gas injection system 6 with a gas throughput 7. The gas of the gas injection system 6 is supplied by a gas supply 8 with a gas pressure 9.

The gas supply 8 is given a set gas pressure value 10 which is obtained by adding the charge air pressure 11 generated by the engine 1 through a turbocharger to a constant gas pressure adjusting value 13 output by a gas pressure adjusting device 12. An adding device 14, which performs the above-mentioned addition, can optionally be supplied with a third input signal 32, which is discussed in detail below. The adjusting device 12 allows manual and/or automatic adjustment of the gas pressure adjusting value 13.

The actual rotational speed 15 of the engine 1 is supplied to a rotational speed controller 16 on which a predetermined constant set rotational speed is set internally. A first control signal 17 output by the rotational speed controller 16, which corresponds to the engine power 3 as absolute value or normalized to the rated power of the engine 1, is supplied to a dividing device 18. The dividing device 18 is given a ratio 20 of the respective contributions of the two fuel types to the overall power of the engine 1 by an adjusting device 19.

The power ratio in the adjusting device 19 can be set manually through operating personnel or automatically. In this way, a manually predetermined ratio 20 for example between zero and one can be automatically set to zero or one within the scope of a rapid changeover if the source of one of the two fuels should fail.

The dividing device 18 outputs a second control signal 21 which indicates the power to be contributed by the liquid fuel and a third control signal 22, which indicates the power to be contributed by the gaseous fuel. Like the first control signal 17, the second control signal 21 and the third control signal 22 each correspond to an absolute value of the power of the engine 1 or they are normalized to the rated power of the engine 1.

The second control signal 21 is supplied to a first conversion device 23, which includes a memory that stores a characteristic describing the relationship between an adjusting signal 24 acting on the fuel injection system 4 and the total power 3 of the engine 1. By means of the saved characteristic, the first conversion device 23 converts the second control signal 21 to a corresponding adjusting signal 24, which is output to the fuel injection system 4 by the conversion device 23.

The third control signal 22 is supplied to a second conversion device 25, which includes a memory that stores a characteristic, which describes the relationship between an adjusting signal 26 acting on the gas injection system 6 and the total power 3 of the engine 1. By means of the saved characteristic, the second conversion device 25 converts the third control signal 22 into a corresponding adjusting signal 26, which is output by the conversion device 25 to the gas injection system 6.

In this manner, the engine 1 can be simultaneously operated with both different fuel types wherein the ratio of their contributions to the total power 3 can be set from the adjusting device 19 to any value between zero and one inclusive. It is clear that the speed with which a change of the ratio 20 through the adjusting device 19 acts on the engine 1 is only dependent on the signal time delays in the control electronics and the response times of the actuators to be activated. Consequently, a changeover from pure gas operation to operation with purely liquid fuel is very fast.

While in the case of liquid fuel only minor quality fluctuations must be expected, gaseous fuel can have noticeable quality fluctuations, i.e. temporal variations of the energy content per unit quantity. The characteristic saved in the second conversion device 25, which converts the predetermined power contribution 22 of the gaseous fuel into an adjusting signal 26 for the injection system 6 assumes a predetermined standard quality of the gaseous fuel. Any deviation of the gas quality from the assumed standard would consequently result in that the control circuit on the gas side would have incorrect parameter settings, which in pure gas operation, upon dropping of the gas quality below the standard, could lead to a dropping of the engine power 3.

In order to offset fluctuations of the gas quality, the function block 27 framed in dashed line in FIG. 1, which altogether can be described as gas quality control, is provided according to the invention. This gas quality control 27 comprises a deducting device 28, which is supplied with the output signal 17 of the rotational speed controller 16 and a power-measurement signal 29. The power-measurement signal 29, which indicates the actual current power output of the engine 1, is supplied by a measuring transducer, which is integrated in a generator 2 driven by the engine 1.

The power-measurement signal 29 is subtracted from the output signal 17 of the rotational speed controller 16, which indicates the set value of the total power 3 of the engine 1 and the difference 30 supplied to a controller 31, which, according to its function, can be called gas pressure correction controller. The output signal 32 of this gas pressure correction controller 31 in fact is added to the gas pressure adjusting value 13 supplied by the adjusting device 12 and results in an increase of the set gas pressure value 10 present at the gas supply 8 and consequently also the gas pressure 9 supplied to the injection system 6 provided the measured value 29 of the actual power 3 is less than the set value 17 of the total power 3 of the engine 1 output by the rotational speed controller 16.

Because of this, a drop of the contribution of the gaseous fuel to the power 3 of the engine 1 can be counteracted and a deterioration of the gas quality offset, however not randomly, but only up to a certain extent since the gas pressure 9 may not exceed a predetermined upper limit. The value range of the output signal 32 of the gas pressure correction controller 31 is thus limited accordingly. In the event that the engine 1 is operated with gas as fuel and the gas quality drops to the extent that the demanded power can no longer be offset by increasing the gas pressure 3 alone, the change can be made to mixed operation and a part of the power generated with liquid fuel. This is a further substantial advantage of the invention.

Upon a renewed rise of the gas quality the actually output power 3 of the engine 1 and thus the corresponding measurement signal 29 increases, which leads to a negative differential signal 30 at the input of the gas pressure correction controller 31 and a reduction of the output signal 32 of this controller 31. This produces a reduction of the set gas pressure value 10. Once the gas has again reached standard quality, the output signal of the gas pressure correction controller 31 is zero and the set gas pressure value 10 again corresponds to the gas pressure adjusting value 13 supplied by the adjusting device 12. It is to be understood that in principle an excessively high gas quality can also be offset through the gas quality control 27 by reducing the set gas pressure value 10, however in practice the problem is rather that the gas quality deviates downwards from the standard value.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for controlling an internal combustion engine operable with at least one of liquid and gaseous fuel, comprising:

a rotational speed controller that outputs a control signal which is dependent on the actual rotational speed of the engine and which influences the power output of the engine, the control signal comprising a dimension for the total power to be output by the engine;

a dividing device configured for receiving the control signal indicating the dimension, dividing the dimension for the total power according to a predetermined ratio into a contribution of the liquid fuel and a contribution of the gaseous fuel, and generating and outputting a second control signal and a third control signal, the second control signal influencing the liquid fuel quantity injected into the engine per unit time and the third control signal influencing the gas fuel quantity injected into the engine per unit time.

2. The device according to claim 1, further comprising an adjusting device configured for at least one of adjusting the predetermined ratio manually and automatically to any value between zero and one inclusive, wherein the dividing device is connected to the adjusting device.

3. The device according to claim 2, further comprising a pressure correction controller and a measuring transducer configured for outputting a power measurement signal comprising a dimension for the actual power of the engine, wherein the power measurement signal is subtracted from the output signal of the rotational speed controller and the difference is supplied to the pressure correction controller that generates an output signal that is added to a set value of the gas pressure predetermined by the adjusting device.

4. The device according to claim 2, further comprising a generator driven by the engine, the generator configured for converting the power output by the engine to electric power, and wherein the measuring transducer is integrated in the generator.

5. The device according to claim 1, further comprising a liquid fuel conversion device and a gas fuel conversion device and wherein the second control signal and the third control signal are supplied to the liquid fuel and gas fuel conversion devices, respectively, each of said liquid fuel and gas fuel conversion devices converts a value of the contribution of the respective fuel type to the engine power indicated by the respective second or third control signal to the value of a respective adjusting signal, which determines the quantity of the respective fuel type supplied to the engine per unit time.

\* \* \* \* \*